United States Patent
Li

(10) Patent No.: US 7,243,604 B2
(45) Date of Patent: Jul. 17, 2007

(54) HIDDEN-RAIL AND DUAL-ATTRACTION BALANCING COMPENSATION TYPE PERMANENT MAGNETIC LEVITATION TRAIN AND RAILWAY SYSTEM

(76) Inventor: Lingqun Li, 3-102, 3B, Jinhairenjia, No. 58 Qingshi Road, Jinshitandujiaqu, Dalian City 116650 (CN)

( * ) Notice: Subject to any disclaimer, the term of this patent is extended or adjusted under 35 U.S.C. 154(b) by 333 days.

(21) Appl. No.: 11/099,284

(22) Filed: Apr. 5, 2005

(65) Prior Publication Data

US 2005/0252407 A1    Nov. 17, 2005

(30) Foreign Application Priority Data

Apr. 9, 2004    (CN) .................... 2004 1 0032560

(51) Int. Cl.
*B61F 13/00* (2006.01)
*B60L 13/00* (2006.01)

(52) U.S. Cl. .................... 104/139; 104/281; 104/282; 104/286

(58) Field of Classification Search ................ 104/139, 104/140, 130.02, 130.03, 130.07, 143, 142, 104/144, 281, 282, 283, 284, 286
See application file for complete search history.

(56) References Cited

U.S. PATENT DOCUMENTS

| | | | | |
|---|---|---|---|---|
| 3,791,308 A | * | 2/1974 | Hartz | 104/139 |
| 4,702,173 A | * | 10/1987 | Perrott | 104/130.07 |
| 4,776,282 A | * | 10/1988 | Ishikura et al. | 104/109 |
| 5,454,328 A | * | 10/1995 | Matsuzaki et al. | 104/139 |
| 5,467,718 A | * | 11/1995 | Shibata et al. | 104/284 |
| 5,778,796 A | * | 7/1998 | Kim | 104/130.07 |
| 5,992,575 A | * | 11/1999 | Kim | 188/38 |
| 6,095,054 A | * | 8/2000 | Kawano et al. | 104/139 |
| 6,240,852 B1 | * | 6/2001 | Camp | 104/140 |
| 6,543,591 B2 | * | 4/2003 | Kuzuya | 191/10 |
| 6,644,208 B2 | * | 11/2003 | Akiyama | 104/130.01 |
| 2003/0084115 A1 | * | 5/2003 | Kim et al. | 104/139 |

\* cited by examiner

FOREIGN PATENT DOCUMENTS

CN    00105737.5    8/2000

OTHER PUBLICATIONS

Qingchao Wei et al., *Magnetic Levitation Railway System and Technique*, China Science and Technology Publishing Company, pp. 19 and 23, Nov. 2003 (with partial English translation).

*Primary Examiner*—Mark T. Le
(74) *Attorney, Agent, or Firm*—Workman Nydegger

(57) ABSTRACT

A hidden-rail dual-attraction balancing compensation type permanent magnetic levitation train and railway system are provided. The hidden rails are provided inside two underground tubes, and each tube is communicated with the ground via a rail through silt. A magnetically conductive wing rail is mounted at each inner side surface of the tube and a central portion of the magnetically conductive wing rail is used as a guide rail, magnetically conductive plate rails are provided on a top inner surface of each tube and arranged at two side of the rail through slit, each vehicle of the train comprises two underground magnetic levitation power cabins located inside the tubes respectively and an aboveground car which are connected integrally to each other via web girder in the shape of a plate therebetween, a top permanent magnet is mounted on a top outer surface of each magnetic levitation power cabin and face a plane of the magnetically conductive plate rail, and two wing permanent magnets are fixed at each outer side surface of the magnetic levitation power cabin and correspond to the magnetically conductive wing rails. A set of power units and two sets of guide fixed pulleys are disposed inside each magnetic levitation power cabin, in which the guide fixed pulleys are contacted with the guide rails on both side inner surfaces of each tube.

11 Claims, 5 Drawing Sheets

HIDDEN-RAIL AND DUAL-ATTRACTION BALANCING COMPENSATION TYPE PERMANENT MAGNETIC LEVITATION TRAIN AND RAILWAY SYSTEM

CROSS-REFERENCE TO RELATED APPLICATIONS

Not applicable.

BACKGROUND OF THE INVENTION

1. The Field of the Invention

The present invention relates to a permanent magnetic levitation train and railway system, more particularly, to a dual-attraction balancing compensation type permanent magnetic levitation train and railway system in which the rails are hidden and mounted under the ground and the train travels above the hidden rails.

2. The Relevant Technology

The rail bound vehicle has been rapidly and significantly developed in recent years and plays an important role in public transportation. For example, subway and light rail train play more and more important roles in urban traffic, and have many advantages, however, they have many disadvantages: the cost of the subway is high about $62-87 million US dollars per kilometer, and it is not convenient to enter into and go out of the subway station. The light rail train requires more land to lay the rails and occupies a land of about twelve thousand square meters per kilometer. In addition, the roadbed is formed by laying broken stones on the ground, so that the light rail train is not environment-friendly and the noise generated therefrom is high. The common disadvantages of the subway and the light rail train are that: the vibration is great, the travel speed is low, the energy consumption is high, the integration level is low, the construction is extensive, and the construction speed is low.

The existing magnetic levitation train system generally employs a technique in which the roadbed is elevated, the speed of the train is high and the train travels between different cities. More particularly, there are mainly three types of magnetic levitation train, i.e., the German TR serial levitation train system employing an "ordinary conductive" gap sensing electromagnetic levitation technique; the Japan MLX serial magnetic levitation train system employing a "super-conductive" electromotive magnetic levitation technique; and the China magnetic levitation train system employing a tube vacuum permanent magnetic compensation type levitation train-elevated railway-station technique. The speeds of the above three types of the magnetic levitation train reach more than 450 km/h, so that they are not suitable for the public transportation in a urban areas in which the distance between adjacent stations is about 500-1000 m. The above techniques are referred to "*Magnetic Levitation Railway System and Technique*" (China Science and Technology Publishing Company, published on November, 2003) and the Chinese Patent Publishing No. CN1264660A entitled "tube vacuum permanent magnetic compensation type levitation train-elevated railway-station system".

SUMMARY OF THE INVENTION

An object of the present invention is to provide a hidden-rail and dual-attraction balancing compensation type permanent magnetic levitation train and railway system, which has good public transportation function in urban areas and high transport capacity, and the speeds with the magnetic levitation train of the present invention can reach 300 km/h.

According to an aspect of the present invention, there is provided hidden-rail and dual-attraction balancing compensation type permanent magnetic levitation train and railway system, comprising:

a track unit including an underground reinforced concrete framework, two tubes parallel to each other and formed longitudinally in the framework, a rail through slit formed in a central portion of a top wall of each tube so as to communicate each tube with the ground, magnetically conductive plate rails mounted on a top inner surface of each tube and arranged at two sides of the rail through slit respectively, and a magnetically conductive wing rail mounted on each side inner surface of each tube, in which a groove is formed in a central portion of each magnetically conductive wing rail and served as a guide rail; and a magnetic levitation train consisting of magnetic levitation vehicles which are connected to one another sequentially, each magnetic levitation vehicle including two underground symmetrical magnetic levitation power cabins located inside the two tubes respectively and an aboveground car, in which each of the magnetic levitation power cabins is connected integrally with a bottom of the car via a web girder in the shape of a plate and passed through the rail through slit, and in which each magnetic levitation power cabin comprising:

an upper wing permanent magnet and a lower wing permanent magnet, which are mounted on each outer side surface of the magnetic levitation power cabin and spaced by a gap therebetween, in which one of the two wing permanent magnets is N pole and the other is S pole, and each wing permanent magnet and the corresponding magnetically conductive wing rail being 5-35 mm apart so as to generate an upward and downward balancing levitation force; and a top permanent magnet provided on a top outer surface of the magnetic levitation power cabin, the top permanent magnet and the corresponding magnetically conductive plate rail provided on a top inner surface of the tube being 20-160 mm apart so as to generate a levitation force whose direction is contrary to the gravity direction, a set of power units which are mounted at a central portion inside each magnetic levitation power cabin, each power unit being composed of a driving wheel, a driving motor, a vehicle-mounted electrical source and an inversion control system, and two sets of guide fixed pulleys which are mounted at both ends inside the magnetic levitation power cabin respectively, and wherein during travel of the magnetic levitation vehicles, the magnetic levitation vehicles are maintained in a levitation state under the levitation force and the upward and downward balancing levitation force, and the guide fixed pulleys and the driving wheels are level with each other and all contacted respectively with the guide rails fixed on both side inner surfaces of each tube for controlling the vehicles centrally between two outermost magnetically conductive wing rails mounted inside the two tubes.

Preferably, the magnetic levitation power cabin is made of an alloy.

Further, the magnetically conductive plate rail and the magnetically conductive wing rail are made of a ferromagnetic steel plate.

In addition, the top permanent magnet is fixed to a magnetically conductive base plate mounted on a top outer surface of the magnetic levitation power cabin.

Preferably, a slide shoe is provided at each outer side end of the magnetically conductive base plate.

Further, the wing permanent magnets are fixed to a wing permanent base provided at each outer side surface of the magnetic levitation power cabin.

Preferably, the aboveground car is used as a passenger car or a cargo car.

Preferably, the aboveground car is made of any one of an alloy, glass and fiberglass reinforced plastics and has a streamlined shape.

Preferably, the web girder is extended from a bottom inner wall of each underground magnetic levitation power cabin to a bottom outer wall of the aboveground passenger car.

Further, the web girder is made of an alloy.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Embodiments of the magnetic levitation train and railway system according to the present invention will be described in detail with reference to the drawings. The detailed description of the embodiments is intended to explain the present invention rather than limit the scope defined by the present invention.

Figure 1:
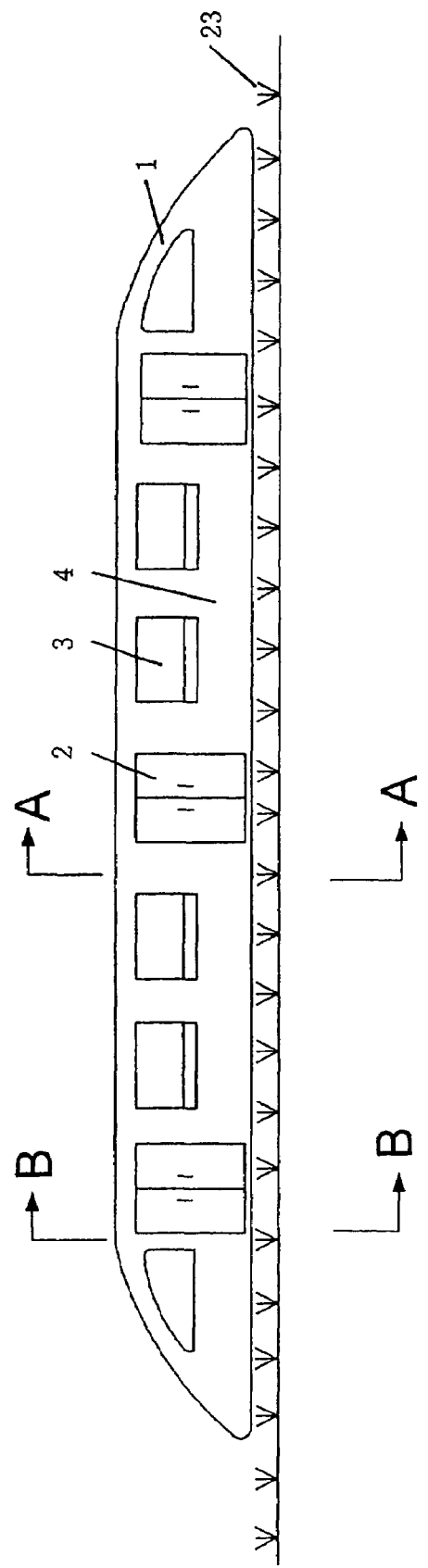
FIG. 1 is a schematic overall view showing an aboveground portion of the hidden-rail and dual-attraction balancing compensation type permanent magnetic levitation train and railway system according to the present invention.

FIG. 1 is a schematic overall view showing an aboveground portion of the hidden-rail and dual-attraction balancing compensation type permanent magnetic levitation train and railway system according to the present invention. As shown in FIG. 1, the magnetic levitation train and railway system according to the present invention comprises a track unit, and a magnetic levitation train which is composed of magnetic levitation vehicles connected to one another sequentially. A head vehicle 1 of the train has a streamlined shape; each vehicle is provided with a plurality of doors 2, windows 3, and an envelope 4 covering the body of the vehicle, in which contacting portions between the doors 2, the windows 3 and the envelope 4 are flattened and smoothened, so that wind resistance can be reduced during travel of the train.

Figure 2:
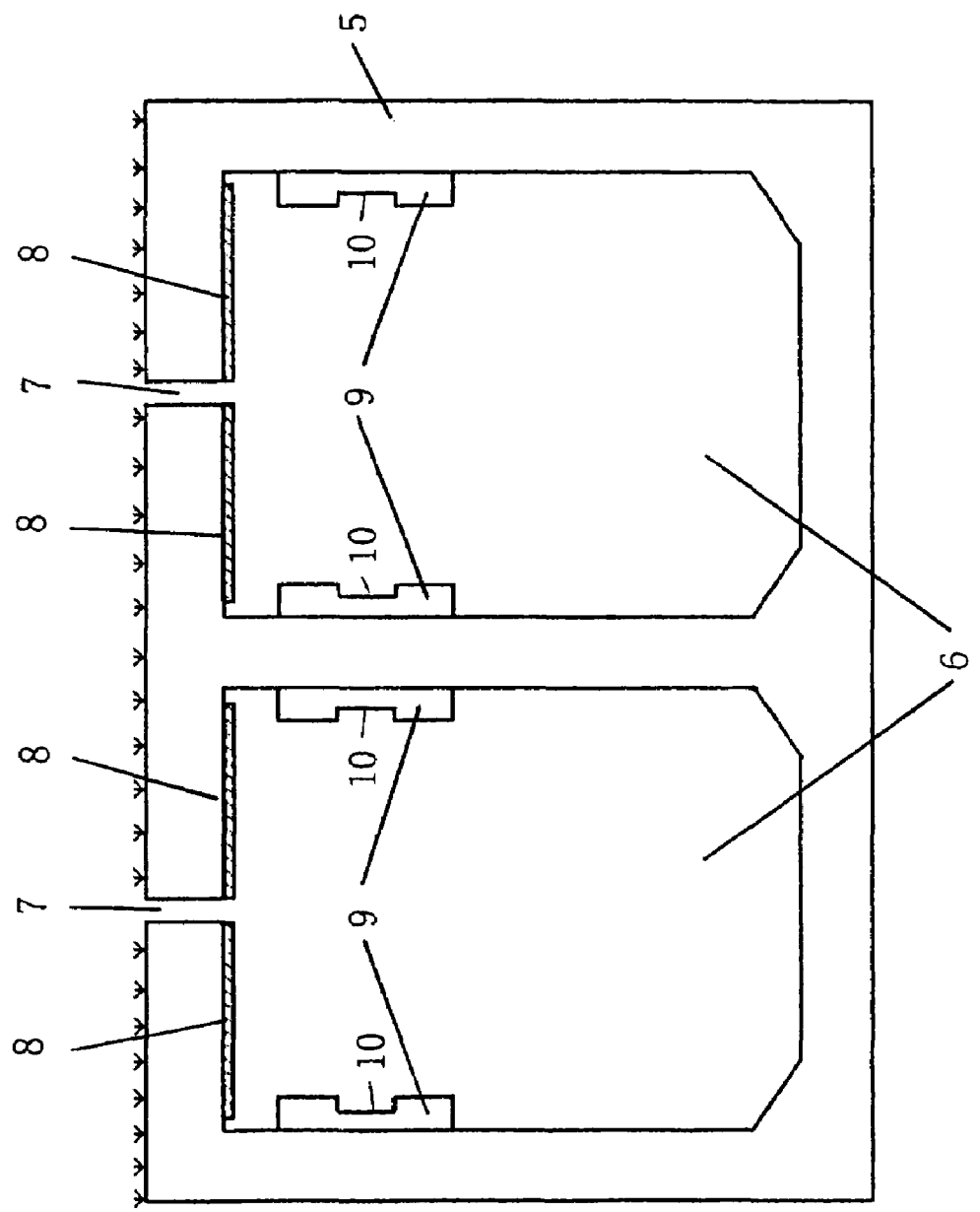
FIG. 2 is a schematic sectional view of the track unit according to the present invention.

FIG. 2 is a schematic sectional view of the track unit according to the present invention. As shown in FIG. 2, the track unit comprises an underground reinforced concrete framework 5, and two tubes 6 parallel to each other are formed in the framework 5. A rail through slit 7 is provided in a central portion of the top wall of each tube 6 so as to communicate the tube 6 with the ground, and the width of the rail through slit 7 is about 30-120 mm.

Two magnetically conductive plate rails 8 made of ferromagnetic steel plate are mounted on a top inner surface of each tube 6, arranged at two sides of the rail through slit 7 respectively, and fixed to the top plates pre-embedded in the top wall of the each tube 6 by means of screws. Two magnetically conductive wing rails 9 made of ferromagnetic steel plates are mounted on both side inner surfaces of each tube 6 and fixed to the side plates pre-embedded in the side walls of the each tube 6 by means of screws, respectively. A groove is formed in a central portion of each magnetically conductive wing rail 9 and served as a guide rail 10.

Figure 3:
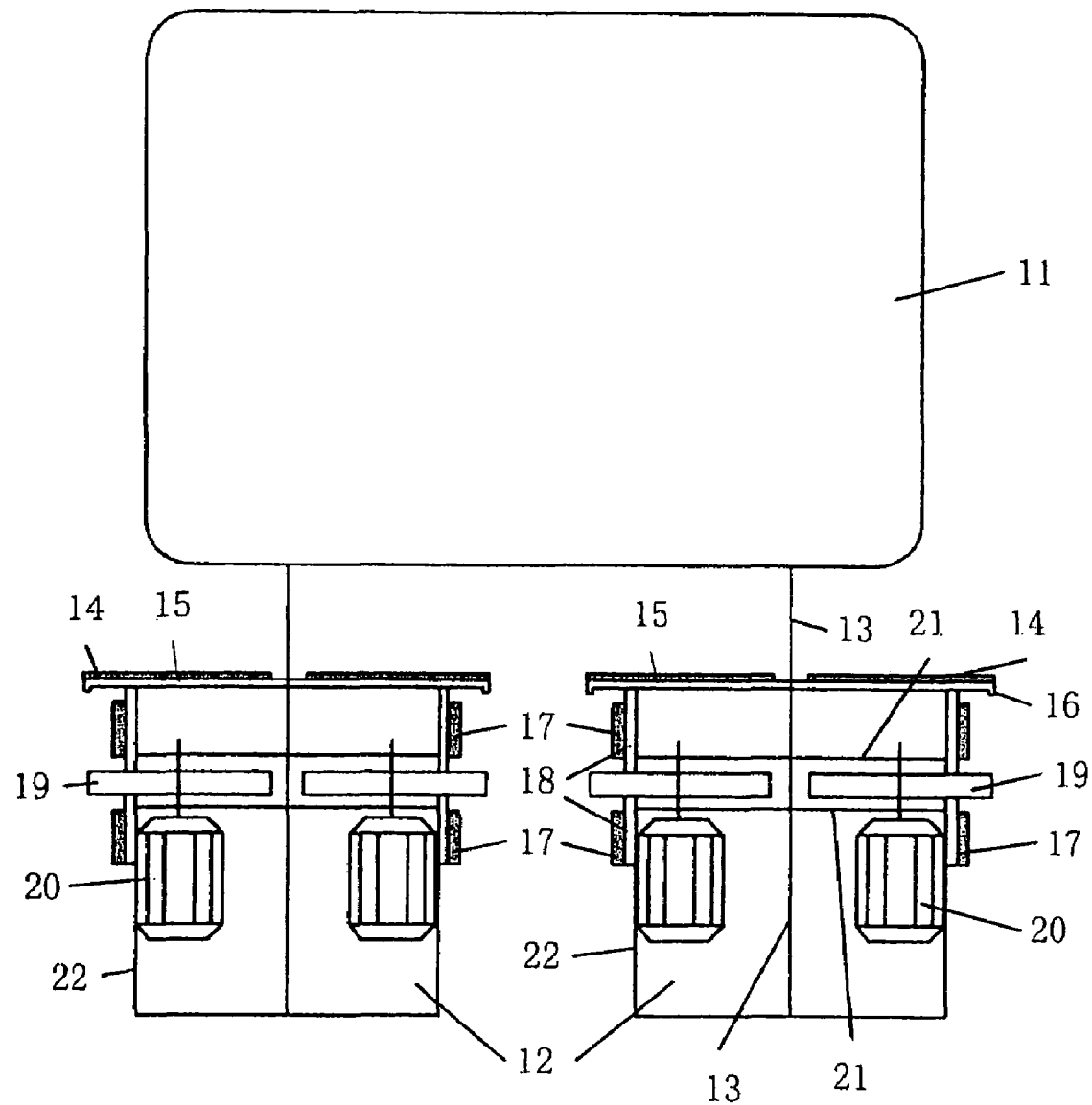
FIG. 3 is a schematic sectional view of a magnetic levitation vehicle according to the present invention.

FIG. 3 is a schematic sectional view of a magnetic levitation vehicle according to the present invention. As shown in FIG. 3, the magnetic levitation vehicle according to the present invention is mainly composed of two parts, i.e., an underground part and an aboveground part. The aboveground part is disposed above the ground and used as a passenger (or cargo) car 11 whose appearance is identical with the conventional car, and the underground part is disposed under the ground and used as two magnetic levitation power cabins 12. The aboveground passenger (or cargo) car 11 and the underground magnetic levitation power cabins 12 are integrally connected via two web girders 13 passed through the rail through slits 7, and each of the web girder 13 is made of alloy and in shape of a plate. The web girder 13 can be extended from a bottom inner wall of each underground magnetic levitation power cabin 12 to a bottom outer wall of the aboveground passenger car 11 so as to increase the rigidity and stability of the vehicle. A set of power units are mounted inside each magnetic levitation power cabin 12, and each power unit comprises a driving wheel 19, a driving motor 20, a vehicle-mounted electrical power source and an inversion control system, and is fixed to the web girder 13 and cabin walls of the magnetic levitation power cabin 12 by means of a wheel beam 21. The driving wheel 19 and the driving motor 20 are coupled coaxially with each other. Since the vehicle-mounted electrical source and the inversion control system are identical with those used in the conventional electric locomotives and well known in the art, in addition, they are not the emphases of the present invention, therefore, the detailed description of the vehicle-mounted electrical source and the inversion control system is omitted. The power units are mounted at a central portion inside each magnetic levitation power cabin 12, that is, the power unit is disposed at a position shown by line A-A in FIG. 1. It is known from the FIG. 1 that the power units are positioned in the middle portion of the vehicle in the present embodiment.

Figure 4:
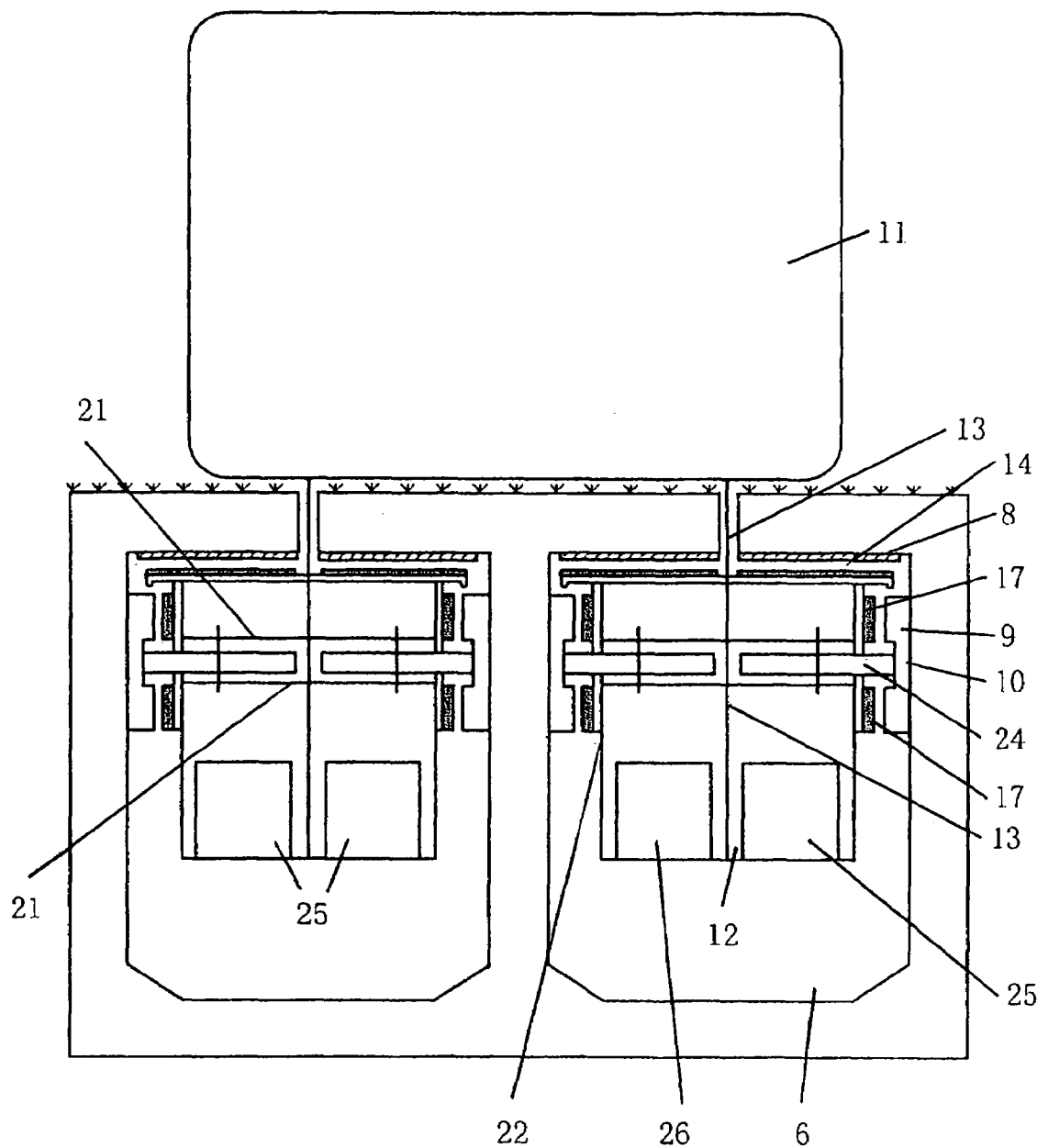
FIG. 4 is a schematic sectional view taken along line B-B in FIG. 1.

FIG. 4 is a schematic sectional view taken along line B-B in FIG. 1. As shown in FIG. 4, in the present invention, two sets of guide fixed pulleys 24 are mounted at both ends inside the magnetic levitation power cabin 12, and fixed to the web girder 13 and cabin walls of the magnetic levitation power cabin 12 via wheel beams 21 respectively. The guide fixed pulley 24 and the driving wheel 19 are level with each other and contacted with the guide rails 10 fixed on both side inner surfaces of each tube 6 for controlling the freedom degree of the magnetic levitation power cabin 19 in left and right directions, so that the vehicles can be controlled centrally between two outermost magnetically conductive wing rails 9 mounted inside the two tubes 6.

The conventional electric locomotive is equipped with driving wheels at both ends thereof, and the driving wheels are used to drive, guide and support the electric locomotive during the reciprocating movement of the electric locomotive. However, adding one set of driving wheels will increase the cost and the weight of the electric locomotive, and the greater the weight of the electric locomotive is, the more energy the electric locomotive consumes. The present invention improves the above power and guide unit of the conventional electric locomotive. More specifically, in the present invention, the power unit is mounted in a middle portion of the vehicle, and fixed pulleys provided at both ends of the vehicle are used as a guide mechanism. With the above construction, the manufacture cost and weight of the vehicle can be reduced greatly.

A magnetically conductive base plate 15 is provided on a top outer surface of the magnetic levitation power cabin 12, and a top permanent magnet 14 is mounted on the magnetically conductive base plate 15 by means of screws. A slide shoe 16 is provided under and fixed to each end of the magnetically conductive base plate 15. A wing permanent base 18 is provided at each outer side surface of the magnetic levitation power cabin 12, and two wing permanent magnets 17 i.e., an upper wing permanent magnet and a lower wing permanent magnet, are fixed to each wing permanent base 18 by means of screws, so that two wing permanent magnets 17 are mounted on each outer side surface of the magnetic levitation power cabin 12, and spaced by a gap therebetween, in which one of the two wing permanent magnets 17 is N pole and the other is S pole.

The top permanent magnet 14 provided on the magnetic levitation power cabin 12 and the corresponding magnetically conductive plate rail 8 provided inside each tube 6 are spaced by a gap having a width of 20-160 mm so as to generate a levitation force whose direction is contrary to the gravity direction. The wing permanent magnets 17 mounted on two outer side surfaces of the magnetic levitation power cabin 12 correspond to the magnetically conductive wing rails 9 mounted inside the tubes 6, and are spaced by a gap having a width of 5-35 mm.

When the wing permanent magnet 17 (the upper wing permanent magnet and the lower wing permanent magnet) is level with the corresponding magnetically conductive wing rail 9, that is, the levitation force generated between the top permanent magnet 14 and the magnetically conductive plate rail 8 is equal to the gravity of the vehicle, but the direction thereof is contrary to the gravity direction, no acting force is generated between the corresponding wing permanent magnet 17 and magnetically conductive wing rail 9. Accordingly, this level of the wing permanent magnet 17 and the magnetically conductive wing rail 9 is referred as a balance point level.

When the level of the wing permanent magnet 17 (the upper wing permanent magnet and the lower wing permanent magnet) is higher than that of the corresponding magnetically conductive wing rail 9, that is, the wing permanent magnet 17 is above the balance point level, the levitation force generated between the top permanent magnet 14 and the magnetically conductive plate rail 8 is greater than the gravity of the vehicle. As a result, a downward acting force is generated between the corresponding wing permanent magnet 17 and magnetically conductive wing rail 9 in the gravity direction, and the direction of the downward acting force is contrary to that of the levitation force, so that the downward acting force will cause the vehicle to move downwardly to the balance point level, then the downward acting force becomes zero when the vehicle reaches the balance point level.

On the other hand, when the level of the wing permanent magnet 17 (the upper wing permanent magnet and the lower wing permanent magnet) is lower than that of the corresponding magnetically conductive wing rail 9, that is, the wing permanent magnet 17 is below the balance point level, the gravity of the vehicle is greater than the levitation force generated between the top permanent magnet 14 and the magnetically conductive plate rail 8, then an upward acting force is generated between the corresponding top permanent magnet 14 and magnetically conductive plate rail 8 in a direction contrary to the gravity direction, that is, the direction of the upward acting force is contrary to the gravity direction and identical with that of levitation force, so compensation type permanent magnetic levitation train and railway system. The hidden that the upward acting force will cause the vehicle to move upwardly to the balance point level, and the upward acting force becomes zero when the vehicle reaches the balance point level.

In other words, the top permanent magnets 14 and the magnetically conductive plate rails 8 located above the top permanent magnets 14 constitute a levitation mechanism generating a levitation force in the upward direction so as to levitate the train. In addition, the wing permanent magnets 17 and the magnetically conductive wing rails 9 generate an upward and downward balancing levitation force, and the upward levitation force cooperates with the balancing levitation force so as to achieve a "dual-attraction balancing compensation type levitation", thus maintaining the vehicles of the train at a predetermined level. If failure of the levitation forces occurs, the vehicles can still travel on the top of the magnetically conductive wing rail 9 by means of the slide shoes 16 so as to ensure safety of the train and railway system.

The magnetic levitation power cabin 12 is also provided with the vehicle-mounted electrical source 25 and the inversion control system 26.

Figure 5:
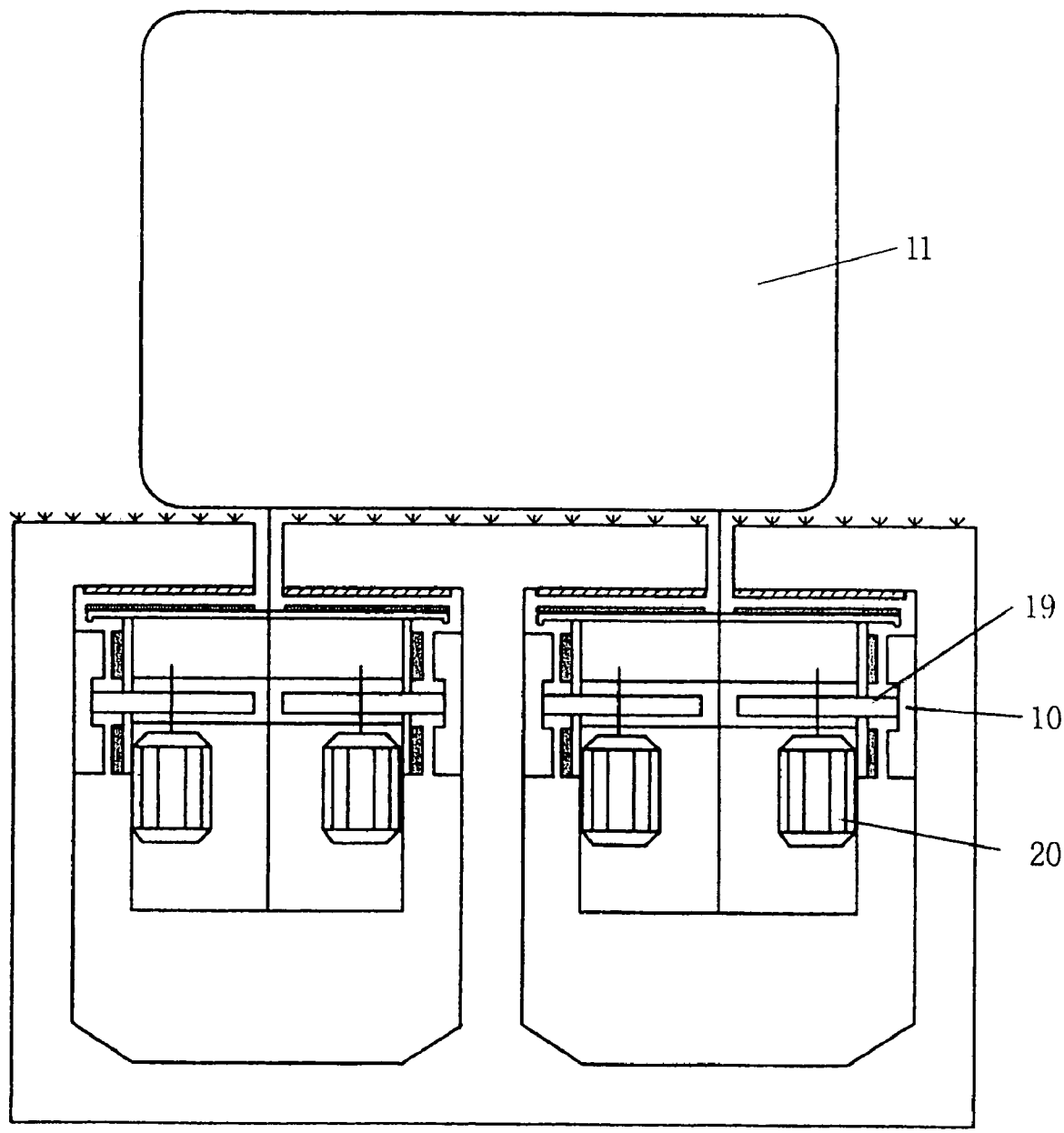
FIG. 5 is a schematic sectional view taken along line A-A in FIG. 1.

FIG. 5 is a schematic sectional view taken along line A-A in FIG. 1. As shown in FIG. 5, the construction of the hidden-rail and dual-attraction balancing compensation type permanent magnetic levitation train and railway system according to the present invention is best shown.

The aboveground part served as the passenger (or cargo) car 11 is used to accommodate passengers or cargos and is designed to have a streamlined shape. The passenger (or cargo) car 11 can be manufactured by any one of the group consisting of an alloy, glass and fiberglass reinforced plastics.

During travel of the magnetic levitation vehicles, the magnetic levitation vehicles are maintained in a levitation state under the levitation forces generated between the top permanent magnets 14 and the magnetically conductive plate rails 8 and the upward and downward balancing levitation forces generated between the wing permanent magnets 17 and the magnetically conductive wing rails 9, and driving electric motors 20 drive the vehicles to travel via driving wheels 19 while guiding of the vehicles are controlled by the guide fixed pulleys 24.

By comparison to the subway train system, the magnetic levitation train and railway system of the present invention has the following advantages:

1. The magnetic levitation train and railway system of the present invention is safe. As for the subway train system, the rails are subjected to concentrated loads, and fatigue of material tends to occur in the rails, so that there are potential safety hazards and potential derailment and overturn hazards. The rails of the present invention is subjected to uniform loads due to the magnetic field, so that fatigue of material does not tend to occur in the rails and there are less potential safety hazards. In addition, the present application employs an integral inlaid structure, so that occurrence of derailment and overturn can be prevented fundamentally.

2. The magnetic levitation train and railway system of the present invention consumes less energy. Since the train is not contact with the rail in the vertical direction, the frictional resistance and wind resistance is low, so that the magnetic levitation train and railway system of the present invention can save 30% energy consumption during travel at a speed of 300 km/h by comparison to the conventional wheel track train system.

3. The speed of the magnetic levitation train and railway system of the present invention is high and noise generated therefrom is low. The speed of the conventional subway reaches 50-100 km/h, however the speed of the present invention can reach 300 km/h and noise generated therefrom can be reduced by 50 percentage.

4. The cost of the present invention is low. The cost of the subway is about 60-87 million US$ per kilometer, however, the cost of the magnetic levitation train and railway system of the present invention is about 0.05 million US dollars per kilometer.

In addition, the magnetic levitation train and railway system of the present invention is environment-friendly. With regard to the light-rail train, the roadbed is formed by laying broken stones on the ground and the train travels on the exposed rails. However, the train of the present invention travels on the hidden rails and the ground can be covered by lawn for greening, so that it seemed that the train is "flying" on the lawn.

The foregoing embodiments and advantageous are merely exemplary and are not intended be constructed as limiting the present invention. The present teaching can be readily applied to other types. Also, the description of the embodiment of the present invention is intended to illustrative, and not to limit the scope of the claims, and many alternatives, modifications, and variations will be apparent to those skilled in the

What is claimed is:

1. A hidden-rail permanent magnetic levitation train and railway system, comprising:

a track unit including an underground reinforced concrete framework, two tubes parallel to each other and formed in the framework, a rail through slit formed in a central portion of a top wall of each tube so as to communicate each tube with the ground, magnetically conductive plate rails mounted on a top inner surface of each tube and arranged at two sides of the rail through slit respectively, and a magnetically conductive wing rail mounted on each side inner surface of each tube, in which a groove is formed in a central portion of each magnetically conductive wing rail and served as a guide rail; and a magnetic levitation train consisting of magnetic levitation vehicles which are connected to one another sequentially, each magnetic levitation vehicle including two underground symmetrical magnetic levitation power cabins located inside the two tubes respectively and an aboveground car, in which each of the magnetic levitation power cabins is connected integrally with a bottom of the car via a web girder in shape of a plate and passed through the rail through slit, and in which each magnetic levitation power cabin comprising:

an upper wing permanent magnet and a lower wing permanent magnet, which are mounted on each outer side surface of the magnetic levitation power cabin and spaced by a gap therebetween, in which one of the two wing permanent magnets is N pole and the other is S pole, and each wing permanent magnet and the corresponding magnetically conductive wing rail being 5-35 mm apart so as to generate an upward and downward balancing levitation force; and a top permanent magnet provided on a top outer surface of the magnetic levitation power cabin, the top permanent magnet and the corresponding magnetically conductive plate rail provided on a top inner surface of the tube being 20-160 mm apart so as to generate a levitation force whose direction is contrary to the gravity direction;

a set of power units which are mounted at a central portion inside each magnetic levitation power cabin, each power unit being composed of a driving wheel, a driving motor, a vehicle-mounted electrical source and an inversion control system, and two sets of guide fixed pulleys which are mounted at both ends inside the magnetic levitation power cabin respectively, and wherein during travel of the magnetic levitation vehicles, the magnetic levitation vehicles are maintained in a levitation state under the levitation force and the upward and downward balancing levitation force, and the guide fixed pulleys and the driving wheels are level with each other and contacted respectively with the guide rails fixed on both side inner surfaces of each tube for controlling the vehicles centrally between two outermost magnetically conductive wing rails mounted inside the two tubes.

2. The hidden-rail permanent magnetic levitation train and railway system according to claim 1, wherein the magnetic levitation power cabin is made of an alloy.

3. The hidden-rail permanent magnetic levitation train and railway system according to claim 1, wherein the magnetically conductive plate rail and the magnetically conductive wing rail are made of a ferromagnetic steel plate.

4. The hidden-rail permanent magnetic levitation train and railway system according to claim 1, wherein the top permanent magnet is fixed to a magnetically conductive base plate mounted on a top outer surface of the magnetic levitation power cabin.

5. The hidden-rail permanent magnetic levitation train and railway system according to claim 1, wherein a slide shoe is provided at each outer side end of the magnetically conductive base plate.

6. The hidden-rail permanent magnetic levitation train and railway system according to claim 1, wherein the wing permanent magnets are fixed to a wing permanent base provided at each outer side surface of the magnetic levitation power cabin.

7. The hidden-rail permanent magnetic levitation train and railway system according to claim 1, wherein the aboveground car is used as a passenger car or cargo car.

8. The hidden-rail permanent magnetic levitation train and railway system according to claim 1, wherein the aboveground car is made of any one of the group consisting of an alloy, glass and fiberglass reinforced plastics and has a streamlined shape.

9. The hidden-rail permanent magnetic levitation train and railway system according to claim 7, wherein the aboveground car is made of any one of the group consisting of an alloy, glass and fiberglass reinforced plastics and has a streamlined shape.

10. The hidden-rail permanent magnetic levitation train and railway system according to claim 1, wherein the web girder is extended from a bottom inner wall of each underground magnetic levitation power cabin to a bottom outer wall of the aboveground passenger car.

11. The hidden-rail permanent magnetic levitation train and railway system according to claim 1, wherein the web girder is made of an alloy.

* * * * *